Oct. 10, 1967   R. H. WESLEY   3,346,303
DYNAMIC WHEEL BALANCER
Filed Aug. 19, 1965
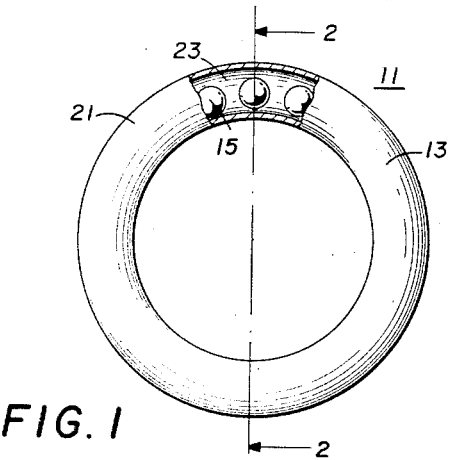
FIG. 1
FIG. 2
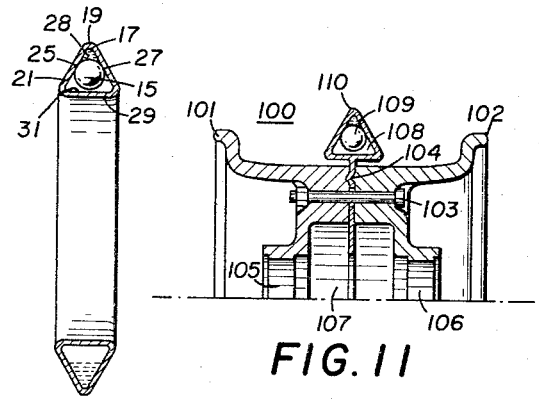
FIG. 11
FIG. 3
FIG. 4
FIG. 5
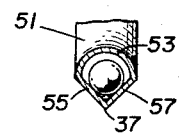
FIG. 6
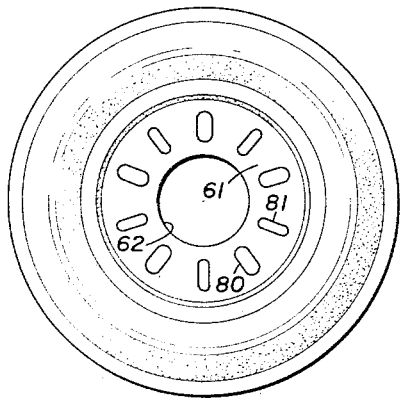
FIG. 7
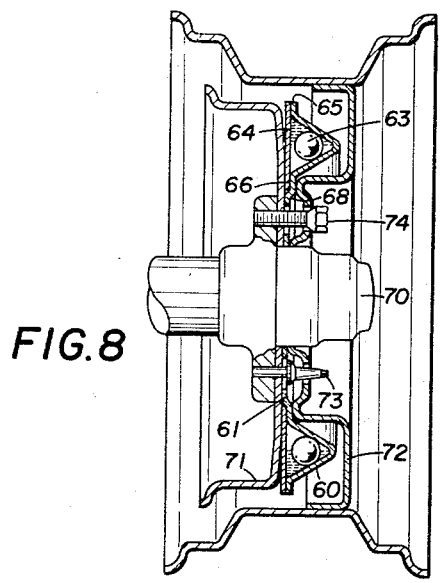
FIG. 8
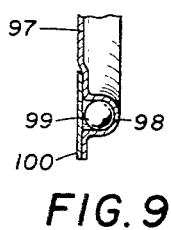
FIG. 9
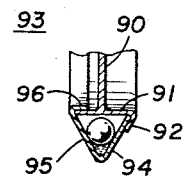
FIG. 10
INVENTOR
RICHARD H. WESLEY
ATTORNEY United States Patent Office 3,346,303
Patented Oct. 10, 1967

3,346,303
DYNAMIC WHEEL BALANCER
Richard H. Wesley, Fort Worth, Tex., assignor to AWB Manufacturing Co., Inc., Stofford, Kans., a corporation of Kansas
Filed Aug. 19, 1965, Ser. No. 480,930
4 Claims. (Cl. 301—5)

This invention relates to dynamic wheel balancers and more particularly to units in which an annular casing which houses movable weights of circular cross section is characterized by a peripheral apex formed by the joinder of two adjacent sides of the casing. In a further aspect, the invention relates to a plate-type balancer peripherally-shaped to form an annular groove which is closed by weldments on opposite sides of the groove.

Dynamic wheel balancers utilized within the past several years typically have taken the form of an annular casing enclosing a plurality of balls or other balancing elements, together with a quantity of oil or other hydraulic fluid. The balancer is concentrically mounted on a wheel, such as a vehicle. The balls position themselves on rotation in a position substantially diametrically opposed to the mass tending to cause imbalance of the wheels. The effect of the positioning of the balls is thus to move the center of mass of the wheel into coincidence with the center of rotation and thus eliminate vibration and uneven operation of the wheel.

The annular casing which carries the ball-shaped weights and a fluid, in accordance with prior art, conventionally has been of a generally circular cross section. To allow for the passage and proper action of the oil medium within the casing, it has been necessary to make the casing considerably larger than the balls. It has been observed that noise and oil turbulence develop in such prior art type of balancer. In accordance with the present invention it has been found that such noise and oil turbulence may be substantially minimized.

The object of the present invention, accordingly, is to provide a dynamic wheel balancer which is quite efficient, but yet operates quietly. It is an additional object to provide such a balancer which may be inexpensively and simply constructed. It is a further object to provide a balancer which may be simply mounted on a wheel.

In accordance with the present invention, the cross-sectional area of the hollow interior of an annular casing carrying balls and fluid is shaped to support the balls by point contact preferably at two separate points so that a movement of the ball is confined to a desired annular path without permitting transverse ball movement. Such cross-sectional area is also shaped to provide for oil movement throughout the casing outside the balls.

Further in accordance with the invention, a disk is provided to be mounted on the hub of an automobile wheel between the brake drum and the wheel flange with a peripheral hollow ring characterized by an outwardly directed apex formed by the intersection of two sides of the ring with balls and fluid positioned within the ring for displacement as required to balance the wheel.

The cross-sectional area of the casing's interior includes at least one apex which is defined by the intersection of two sides of the periphery of the casing. The balls will be supported at one point only on each side of the apex.

For a more complete understanding of the present invention and for further objects and advantages thereof, reference may now be had to the following description taken in conjunction with the accompanying drawings in which:

FIGURE 1 is an elevational view partially in section showing a wheel balancer in accordance with the present invention;

FIGURE 2 is a section taken along lines 2—2 of FIGURE 1;

FIGURE 3 is a section, comparable to that of FIGURE 2, of another embodiment of the present invention.

FIGURE 4 is a section, comparable to that of FIGURE 2, but yet another embodiment;

FIGURE 5 is a section, comparable to that of FIGURE 2, of still another embodiment;

FIGURE 6 is a section, comparable to that of FIGURE 2, of a further embodiment;

FIGURE 7 is an elevational view of a balancer formed from a central disk;

FIGURE 8 is an axial sectional view of the balancer of FIGURE 7 installed on a wheel;

FIGURE 9 illustrates a disk based embodiment of FIGURES 1 and 2;

FIGURE 10 illustrates a modification of the construction of FIGURE 9; and

FIGURE 11 is a sectional view of a split wheel installation.

In FIGURE 1 an annular wheel balancer assembly 11 is illustrated. The assembly 11 includes the annular casing 13 of generally triangular cross section and having a plurality of metallic balls 15 carried in the triangular cross-sectional interior. The balls 15 are preferably made to close tolerances in order that they may conform substantially to the size of a circle inscribed within the cross section of the casing, yet move freely in the annular path of the interior of the casing without binding. The casing 13 further carries a hydraulic fluid 17. Preferably, the space in the casing is filled with such fluid to a level such that when the casing is rotating, the fluid will fill the apex and immerse at least a portion of the outer surface of a ball.

As shown in FIGURE 2, the wheel balancer assembly 11 is schematically pictured under the condition of rotation of the casing 13 about its central axis. The balls 15 and fluid 17 are urged to the outer portion of the annulus under the action of centrifugal force. Thus, the apex 19 which is defined by the intersection of triangular sides 21 and 23, is filled with fluid and point contacts occur at 25 and 27 between each ball 15 and the respective sides 21 and 23. The fluid is present in sufficient quantity preferably to immerse the contact points. A lubricating fluid preferably is provided. The interior of the casing between the ball and the apex 19 defines a fluid path 28 through which fluid may pass freely without tendency to develop high turbulence.

It will be seen that any clearance between the balls 15 and the casing will be evidenced by a displacement between the inner side 29 of the casing and the adjacent periphery of the balls. Such clearance is indicated in the region 31, FIGURE 2. By virtue of the construction just described, the balls 15 have firm, two-point support provided by the contacts with the surfaces 21 and 23, during rotation of the casing. Accordingly, transverse movements of the balls, as would occur in a large circular cross section type casing, are minimized.

It is preferred that the ball be made to rather close tolerances to minimize the clearance between the balls and inner region (portion away from central axis) of the casing. Vibration is minimized by the present invention even when such clearance is large. However, a certain amount of undesirable movement will occur with large clearance during periods when wheel speed is changing drastically. By minimizing the clearance, very little transverse ball movement is observed under any operating conditions. Clearance between the ball 15 and wall in region 31 preferably will be of the order of 0.010 to 0.015 inch.

The configuration of the casing of the present invention may take a variety of cross-sectional forms, as long as at least one apex is present in an outer region of the casing to provide two-point contact to the balls while the casing is being rotated about its axis. Thus, as illustrated in FIGURES 3, 4, and 5, respectively, the cross section of the interior of the casing may be rectangular, pentagonal, or octagonal. Indeed, any polygonal shape may be used.

A portion of the cross section of the interior of a casing of the present invention may be curved, so long as such cross section includes at least one apex in an outer region of the annular member. FIGURE 6 illustrates a casing 51 having an inner wall 53 which is arcuate. Conical sections 55 and 57 terminate in an intersection 37 and are joined to arcuate section 53 defining an apex. It will be seen that the balls 15 bear against the sections 55 and 57 when under the action of centrifugal force to throw it outwardly with respect to the annular casing. Accordingly, the balls receive two-point support.

While the ring container of FIGURES 1 and 2 might be mounted on a suitable hub or might be clip mounted onto a wheel, a preferred embodiment of the invention involves the formation of the annular casing in which the balls are housed from a disk which is centrally perforated to pass over a hub and which is provided with slots for mating with lug bolts and positioning studs. Such a unit is illustrated in FIGURES 7 and 8.

As shown in FIGURES 7 and 8, the balancer 60 includes a disk 61 having a central aperture 62 with a triangular peripheral groove 63 formed therein. A flat ring 64 is welded at its outer perimeter to the flange 65 on the disk 61 and in the region 66 to the zone just inside the triangular groove 63. As best shown in FIGURE 8, the balancer 60 is mounted on the hub 70 of an automobile wheel. The disk 60 is positioned between the outer wall of the brake drum 71 and the inner surface of the wheel 72. A positioning stud 73 passes through holes in the balancer 60. Lug bolts 74 similarly mate with holes in the balancer. The triangular recess in which the balls operate thus is positioned at a point spaced from the axis of the hub 70 and in the zone between the wheel flange and the brake drum. The disk 61 has two sets of lug bolt slots punched therein. The set, including the slot 80, is of one width, whereas the set including the slot 81 is of another width. The balancer as shown in FIGURE 7 is particularly adapted for use on wheels having five lug bolts. By making elongated slots 80 and 81, various models and makes of cars can be accommodated with a single unit. In one embodiment, the outside diameter of the balancer 60 was eight and one-half inches. This fits many current makes of cars whereas some larger cars will accommodate balancers of diameter up to eleven inches. For a given outer diameter, practically all makes of cars currently on the market can be accommodated by four different sets of balancers, the sets being distinguished one from another by the number of studs and the diameter of the bolt circle. The four units would be distinguished one from another by the following features:

(a) Five studs on five and one-half inch bolt circle;
(b) Six studs on five and one-half inch bolt circle;
(c) Six lug bolts on seven and one-quarter inch bolt circle; and
(d) Four lug bolts on four and one-half inch bolt circle.

The balancer of FIGURES 7 and 8 is particularly desirable in that the hollow ring in which the balls operate can be formed by conventional stamping techniques. However, hydraulic techniques are preferred for forming the annular casing. This is because the structural tolerances can be maintained with no spring-back after the forming operation. As a result of these characteristics, the path thus formed in which the balls move will be smooth and uniform resulting in minimum noise and obstruction to motion. The disk 61 is offset at point 68. The ring 64 is inset to form a planar surface with the center portion of the disk 61.

In FIGURE 9 an embodiment has been illustrated which provides an apex or annular corner in the annular ball race which is formed in a flat disk and a flat washer is welded to the flange of the plate. Thus, the rim is grooved curvilinearily having a U-shaped groove 98 formed near the periphery thereof. The flat ring 99 welded onto the surface of the disk 97 closes the groove and forms a ball-carrying annular path. The corner 100 provides a zone in which the fluid will accumulate as the unit is brought up to speed. This permits the maintenance of a film of oil on the balls where the oil employed is adequate to maintain a film on the contact surfaces. If the groove 98 has parallel legs, then the balls may tend to ride solely on the outer leg. If the legs are angled, then the ball will ride on two contact points. One point is on the outer leg of the U-shaped groove 98 and the other point is on the inner face of the ring 99.

FIGURE 10 illustrates one construction of the embodiment shown in FIGURE 2. In this embodiment, the central disk portion 90 is provided with a rim 91 which has one edge or lip 92 folded at a 60° angle. A cap ring 93 has one leg 94 which fits under the lip 92. The side 95 has an inturned lip 96 to fit under the plate 91. The elements are welded together along lips 92 and 96 to form a triangular-shaped annular zone which is substantially symmetrical to the axis of the central flange 90.

In a further aspect of the invention and in order to reduce noise and to improve the overall efficiency of the unit, hydraulic fluid such as normally employed in brake systems is introduced into the annulus in an amount sufficient at least to immerse the contact point 75 (FIGURE 8) when the wheel is in motion. Further, the stability of the system and its operation is enhanced by introducing additives to the hydraulic fluid. Vermiculite, in commercial form, is a most desirable additive in that it is chemically inert in oil to a temperature of up to about 2000° F. It remains in suspension and will not cake or build-up on itself. However, it will form a film on the walls and serve to insulate them from the bare metal of the balls. Thus the continuous action of the balls riding along the track will form a vermiculite coating at the line contact thus separating the metal surfaces. This reduces noise, friction, and wear. The vermiculite will not build on itself although it adheres to the metal and separates the surface of the ball from its contact on the metal annular path. After an initial deposition, the thickness will remain uniform. If the material is scraped off or removed from a portion of the contact path, it will immediately be replaced to the same thickness as the remaining material.

In FIGURE 11, the balancer of the present invention has been illustrated incorporated in an airplane installation where the wheel is a split wheel.

Only the upper half of the wheel 100 has been shown. The wheel 100 is split in the center into two sections 101 and 102. The sections are formed with outer beads thereon to form a sealing relation with a tubeless tire. The two halves are bolted together as by bolts 103. They are positioned by suitable indexing means such as the groove and rib structure 104. Ports are formed in the center of each wheel flange in which bearings are to be mounted for journaling an axle. The center bearing port 105 is formed in the section 101 and the port 106 in section 102.

In accordance with this invention, a disk 107 having a central aperture therein is mounted between the two sections 101 and 102. The disk 107 has a groove to mate with the structure 104 and has holes to receive the lugs 103. Disk 107 also has an annular, hollow, peripheral chamber 108 which contains the balancing balls 109. The chamber may be of any of the forms illustrated in FIGURES 2–6, 9, or 10 and is characterized by the perimeter 110 being formed by the juncture of the two adjacent angularly directed walls.

The structure illustrated in FIGURE 11 involves a unique combination of a split wheel with a balancing ring characterized by a preshaped disk made integral with the wheel itself.

The balls 109 move through the triangular annulus in a cushion of oil, the oil being permitted to bypass the balls in the apex of the triangular section, while the triangular section provides for two-point contact between the balls and the walls of the annulus.

Having described the invention in connection with certain specific embodiments thereof, it is to be understood that further modifications may now suggest themselves to those skilled in the art and it is intended to cover such modifications as fall within the scope of the appended claims.

What is claimed is:
1. A wheel balancer which comprises:
 (a) a disk having a central hub port and angularly spaced elongated lug bolt slots therein,
 (b) a washer welded to said plate with one of said plate and said washer having an annular hollow peripheral groove therein and the other forming a closure for said groove to form a hollow peripheral ring characterized by an apex at the outer perimeter formed by the juncture of said plate and said washer,
 (c) a plurality of balls in said ring having a diameter less than the maximum ball diameter that may be accommodated in said ring wherein rotation of said balancer causes said balls to be disposed about said ring in wheel balancing positions, portions of said balls adapted to be generally disposed in the apex of said ring during rotation of said balancer to substantially eliminate transverse ball movement, and
 (d) a damping fluid in said ring of quantity to fill said ring to a depth at least to maintain the points of contact between one of said walls and said balls immersed when said balancer is under rotation.

2. The wheel balancer of claim 1 in which said ring cross section is rectangular.

3. The wheel balancer of claim 1 in which said ring cross-sectional shape is a triangle.

4. The wheel balancer of claim 3 in which said triangle is equilateral.

References Cited

UNITED STATES PATENTS

| 414,642 | 11/1899 | Herrick | 301—5 |
| 1,314,005 | 8/1919 | Louden | 301—5 |
| 2,590,363 | 3/1952 | Adair | 301—9 |
| 2,687,918 | 8/1954 | Bell | 301—5 |
| 2,719,756 | 10/1955 | Duke | 301—5 |
| 2,895,766 | 7/1959 | Leopold | 301—5 |
| 3,164,413 | 1/1965 | Salathiel | 301—5 |

FOREIGN PATENTS

| 832,048 | 4/1960 | Great Britain. |

BENJAMIN HERSH, *Primary Examiner.*
RICHARD J. JOHNSON, *Examiner.*